Patented Oct. 29, 1940

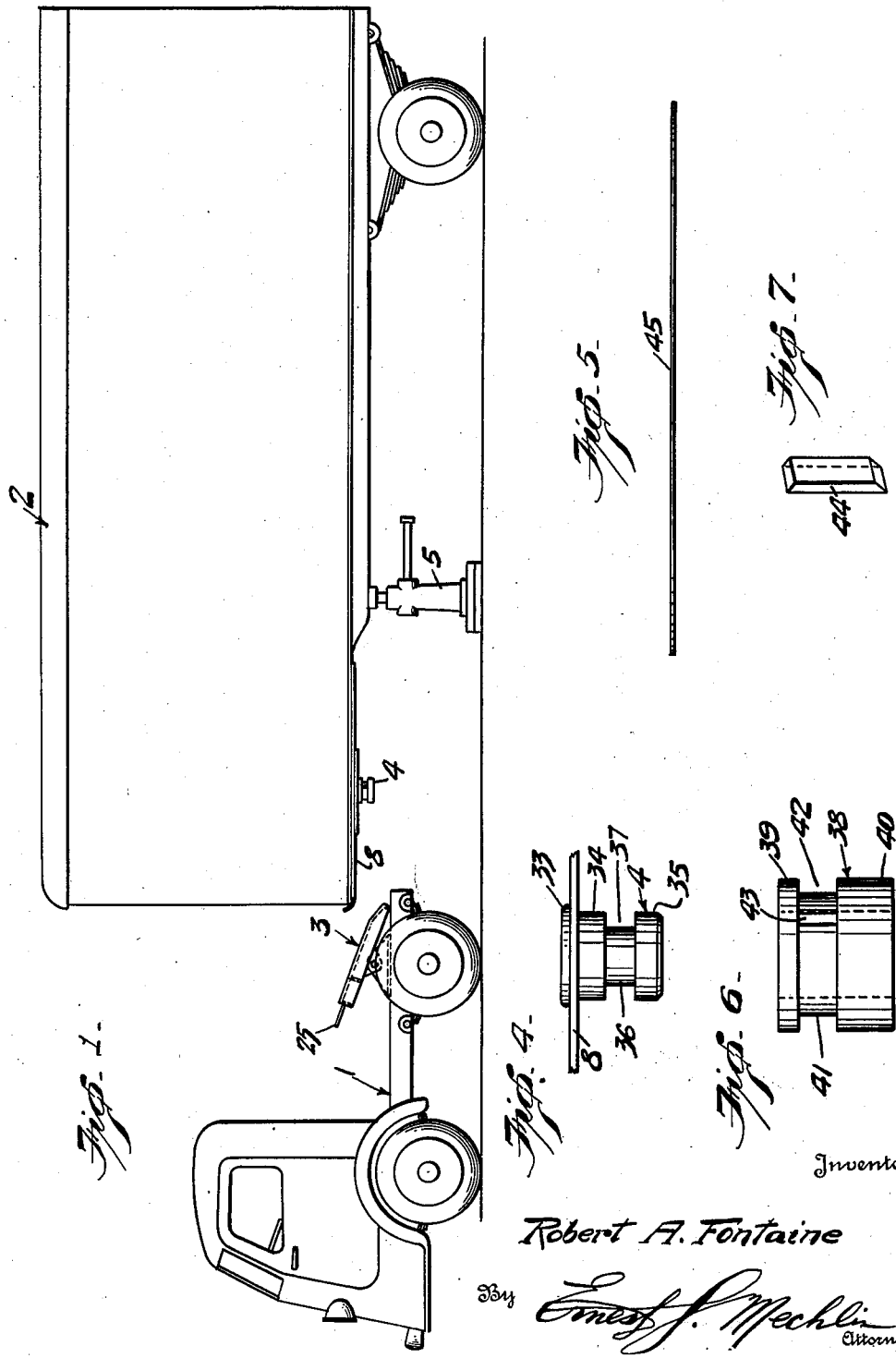

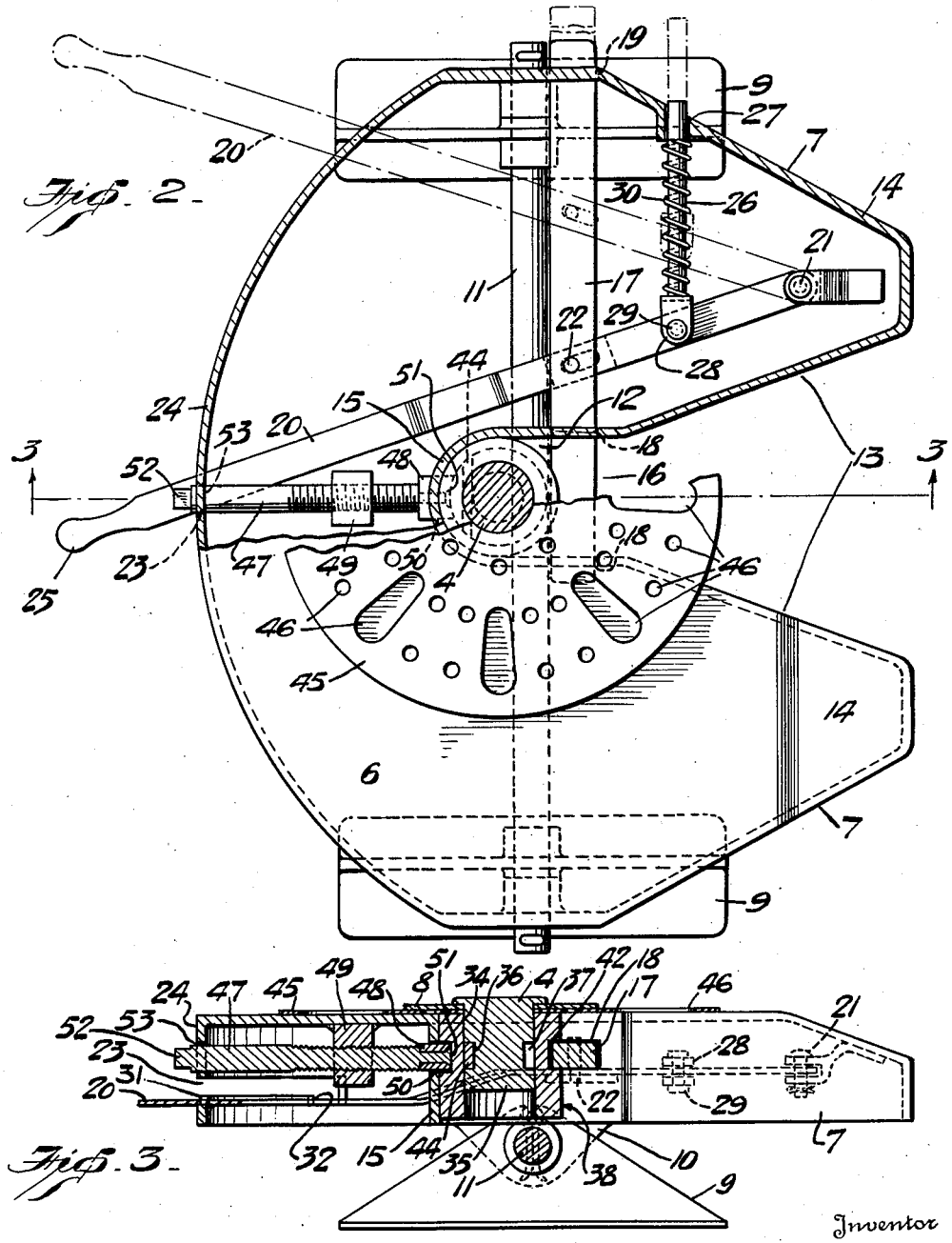

2,219,415

UNITED STATES PATENT OFFICE 2,219,415

COUPLING FOR TRUCKS AND TRAILERS

Robert A. Fontaine, Martinsville, Va.

Application September 17, 1938, Serial No. 230,492

12 Claims. (Cl. 280—33.1)

This application is a continuation in part of my application for Truck and trailer connections, filed June 30, 1936, Serial No. 88,219.

The invention, generally considered, relates to couplings for trucks and trailers whereby a truck can be connected to and used as a power unit for any one of several trailers, its availability for service being uninterrupted during loading or unloading of the trailers.

Heretofore it has been considered necessary to provide a loose connection between a power unit and a trailer in order to permit the free relative angling movement of the coupled units. The play resulting from the loose connection is, however, extremely detrimental to the life of the coupling and this is particularly true when the increased weight, length and capacity of modern trailers is considered. It was with this patent defect of couplings in mind that the present invention was evolved.

The primary object of the invention is to provide a novel coupling for trucks or power units and trailers in which the parts of the coupling which are in direct engagement are maintained against all relative movement when coupled while permitting free relative angling movement between the truck and the trailer.

Another object of the invention is to provide novel forms of anti-friction devices for use with such couplings whereby the friction normally developed by the relative angling movement of the truck and trailer and the resultant wearing of associated parts is reduced to a minimum.

Still another object of the invention is to provide a novel form of coupling which is adapted for use with a standard king pin without change in the structure of the latter.

A further object of the invention is to provide a novel coupling in which the parts most subject to wear are inexpensive and can be easily and quickly disassembled and replaced.

A still further object of the invention is to provide a novel coupling which will be simple, easy to construct and operate, and a general improvement over the art.

To the attainment of the foregoing and other objects, the invention preferably consists in the arrangement and combination of parts to be hereinafter more fully described and claimed, and illustrated in the accompanying drawings in which:

Figure 1 is a somewhat diagrammatic view in side elevation of a truck and trailer, the units being shown as uncoupled, Figure 2 is an enlarged plan view of a fifth wheel, partly in section, the multi-part king pin being shown in coupled relation thereto, Figure 3 is a central vertical cross sectional view taken along lines 3—3 of Figure 2, the direction of the view being indicated by the arrows at the ends of the section lines, Figures 4, 5, 6 and 7 are enlarged views of parts of the multi-part king pin in disassembled relation, Figures 4, 5 and 6 being side elevational views of the king pin, bearing plate, and bushing, respectively, and Figure 7 being an isometric view of the retaining pin.

Referring more particularly to the drawings, 1 indicates a truck or power unit and 2 a detachable trailer or trailer body, the units being of the types now in general use where considerable time is consumed in the loading and unloading of the trailers and the availability of the power unit for continuous service is an important factor in operating costs. On the truck or tractor is mounted a fifth wheel or tilting table, indicated as a whole by the numeral 3, which is adapted to engage and interlock with a king pin 4 connected to and depending from the underside of the trailer, thereby coupling the truck and trailer together.

To prevent injury to the load in the trailer as well as to facilitate attachment or coupling of the trailer to the truck, it is desirable to provide some means for maintaining the trailer in substantially horizontal position while detached. To this end any suitable supporting means can be placed under the forward end of the trailer, that shown being the jack 5.

The fifth wheel comprises a top plate or cover 6, a flange or skirt 7 extending along and depending from the peripheral edge of the cover, and the various operative parts of the fifth wheel mechanism for which the cover and the flange form a housing, the flange in addition acting as a reinforcing member for the cover. The fifth wheel is pivotally or tiltably mounted on the truck, and preferably eccentrically mounted, so as to normally occupy the position shown in Figure 1 when the trailer is detached. The normally tilted fifth wheel provides an inclined surface which is adapted to engage and raise the forward end of the trailer to its normal coupled position. To reduce the wear resulting from such engagement the underside of the forward portion of the trailer is provided with a metal plate or shoe 8.

A rugged and very practical mounting for the fifth wheel is obtained by securing a pair of transversely spaced upstanding brackets 9 to the frame of the truck. The coacting members on the fifth wheel are the oppositely disposed arms 10 which extend downwardly from the opposite sides of the fifth wheel and are preferably formed integrally with the flange 7. The arms and brackets are connected by a transverse rod or axle 11 which is journaled in bearings in the brackets and extends through bearings in the arms, thereby supporting the fifth wheel and allowing it to pivot or tilt relative to the truck. By positioning the arms forwardly of the center of gravity of the fifth wheel the latter is adapted to normally tilt rearwardly in the position best suited for coupling the truck to its trailer.

For the reception of the king pin, the fifth wheel is provided with a rearwardly opening pocket or socket 12 having a flaring or wedge shaped entrance 13 defined by the inwardly facing edges of the V-shaped portions 14 into which the rear part of the cover 6 is divided. The forward wall 15 of the socket, against which the king pin abuts when coupled, is cylindrical to provide the largest possible bearing area between the king pin and the fifth wheel. Between the cylindrical forward wall and the flaring entrance the side walls of the socket are parallel throughout at least a portion of their length, forming a channel-like passage 16 guidably receiving the king pin and limiting its lateral motion relative to the fifth wheel. The walls of both the socket and the flaring entrance may be and preferably are continuous parts of the depending flange 7 and are also preferably of greater depth than the king pin.

For the purposes of this invention, the king pin retaining means may be of any desired type, that disclosed in my co-pending application 88,219 being very suitable. The type here shown comprises a longitudinally slidable lock bar 17 guidably movable within slots 18 in the opposing walls of the passage 16 and through a slot 19 in one of the side walls of the fifth wheel. The operating means for the lock bar comprises an elongated lever 20 pivoted at 21 within one of the V-shaped portions 14. This lever is pivotally and slidably connected at 22 with the lock bar and is of sufficient length to extend through the slot 23 in the curved or semielliptic forward wall 24 of the fifth wheel, the projecting end constituting a handle 25. The means for urging the lock bar into its king pin engaging position consists of a rod 26 slidable through a slot 27 in one side wall of the fifth wheel and having its outer end terminating in a clevis 28 pivoted at 29 to the lever 20, the rod being surrounded by the spring 30 which abuts against the clevis and against the side wall of the fifth wheel for urging the lever 20, and consequently the lock bar 17, toward the king pin. To insure the retention of the lock bar in locked or released position, the latter being indicated by the dot and dash lines in Figure 2, notches 31 and 32 are provided at either end of the slot 23.

In the multi-part king pin or king pin assembly, with which this invention is particularly concerned, the king pin 4 is of the standard type used on trailers. Adjacent the upper portion of the king pin is a shoulder or flange 33 which is adapted to overlie and abut the upper side of the shoe 8 and extend within the underside of the trailer, the engagement between the shoe and the shoulder serving to retain the king pin fixedly in place. Below the shoulder and extending outwardly of the shoe are vertically spaced upper and lower cylindrical main portions or collars numbered 34 and 35, respectively, joined by an axially disposed trunnion or connecting member 36. Defined by the collars and the trunnion is a peripheral groove or recess 37.

In the type of couplings now in general use, the lock bar or equivalent king pin retaining means on the fifth wheel directly contacts the king pin. The lock bar fits within the peripheral groove 37, the rearward and upward movement of the king pin being prevented by the engagement of the lock bar with the trunnion 36 and the cylindrical collar 35. While uncoupling of the truck and trailer during operation is thus effectively prevented, considerable wear takes place, particularly in the king pin and the lock bar because of the line contact between the lock bar and the trunnion. If allowed to continue unfettered, the wearing will eventually necessitate replacement of both the king pin and the lock bar, the latter of which entails removal of the shoe consuming considerable time.

To protect the king pin from wear and avoid the necessity of frequent replacement, direct contact between the king pin and the fifth wheel is prevented by providing an associated sleeve, bushing or bearing 38 which surrounds or encircles and movably or rotatably engages the king pin. The rotatable or slidable engagement of the bushing with the king pin not only facilitates fitting of the bushing on the king pin but prevents frictional resistance between the bushing and the fifth wheel from interfering with the relative angling movement of the truck and trailer. To further prevent such interference it may be desirable to insert some lubricating means such as grease or ball or roller bearings between the bushing and the king pin.

The bushing is formed of vertically disposed upper and lower cylindrical members or rings 39 and 40, respectively, integrally connected by an intermediate cylindrical member or ring 41 of smaller outer diameter than the upper and lower rings. The inner surface of the bushing is cylindrical and of a diameter substantially equal to that of the collars 34 and 35. The peripheral indenture or relief 42 defined by the upper and lower cylindrical rings 39 and 40 is preferably of substantially the same height as, and in registering or horizontal alinement with, the peripheral groove 37 when the bushing is in place. The intermediate ring 41 is provided with oppositely disposed slots 43 desirably extending the full height of the relief for the reception of a key or retaining pin 44, the slots being so positioned that the key when inserted will tangentially engage the trunnion 36. The tangential engagement is not essential but is preferable in order to obtain the greatest possible bearing surface between the key and the upper surface of the lower collar on the king pin without affecting the relative rotative movement of the king pin and bushing. The key is of sufficient length to extend within and abut the upper surfaces of the slots 43, thereby locking the bushing and king pin against relative vertical movement. The end surfaces of the key preferably conform to the cylindrical outer surface of the intermediate ring in order to present a smooth surface for engagement with the locking means on the fifth wheel.

In addition to the wearing of the king pin in the ordinary coupling, considerable wear also occurs in the top plate of the fifth wheel because of its frictional contact with the shoe on the underside of the trailer. While the wear is not of great import, the frictional resistance, by which it is caused, is very objectionable because of the large area of the contacting surfaces. The friction thus produced interferes considerably with the relative angling of the truck and trailer and tends to cause the fifth wheel and shoe to bind or stick. To prevent any possible binding an anti-friction means in the form of a bearing plate or disk 45 which is carried by the king pin is inserted between the fifth wheel and the shoe. The disk fits around and extends radially from the king pin adjacent the upper extremity thereof and is interposed between the shoe and the upper surface of the bushing 38, engagement with the latter serving to retain it in place when the trailer is uncoupled. To obtain the necessary lubrication, the disk can be either made of anti-friction metal, such as bronze, or provided with spaced perforations 46, as in Figure 2, which are adapted to hold the lubricant. The perforations can be arranged in any desired manner, that shown being merely one arrangement which has proved satisfactory. To preserve the preferable horizontal alinement of the recess 37 and the relief 42, the interposition of the disk between the bushing and the shoe necessitates that the upper ring on the bushing be of correspondingly less height than the upper collar on the king pin.

When in coupled position the king pin and its attendant bushing occupy the socket 12 in the fifth wheel, the socket being, of course, sufficiently large to accommodate the bushing and necessarily larger than the socket ordinarily used if the king pin is of standard size. The rearward movement of the king pin is prevented by the retaining means as in the ordinary coupling, the only difference being that the lock bar slides into the relief 42 and interlocks with the bushing instead of directly engaging the king pin. Although the large surface contact between the bushing and the king pin practically eliminates wear in the king pin, the frictional resistance between the bushing and the lock bar is not sufficient to prevent relative movement of the bar and the bushing and consequent wear on the lock bar. In order to eradicate this additional source of wear, it is necessary to provide some means which will prevent such relative movement without interfering with the angling movement of the trailer relative to the truck. Any means desirably associated with the fifth wheel which will force or jam the bushing into tight engagement with the lock bar will accomplish this result.

A simple and very effective forcing means preferably comprises a bolt or shaft 47 having a head or block 48 adapted to engage the intermediate ring of the bushing is movably associated with a lug, nut or hanger 49, welded or otherwise attached to the undersurface of the cover 6. To obtain the maximum resultant force against the lock bar, the bolt preferably extends along the longitudinal axis of the fifth wheel.

The head which is shown rectangular in shape projects through and is slidably guided by a correspondingly shaped opening or aperture 50 in the forward wall of the socket 12, the aperture and leg being desirably so positioned that the head is in horizontal alinement with the lock bar to permit it to engage the intermediate ring on the bushing. The face 51 of the head which engages the bushing is desirably arcuate or cylindrically convex to conform to the corresponding surface on the bushing to permit surface contact between the head and the bushing.

Rotative movement of the head relative to the fifth wheel is prevented by the aperture and it is, therefore, necessary that the head be pivotally or rotatably attached to the bolt in order to allow the latter to be tightened. Such attachment can be obtained by loosely riveting the head to the bolt as shown in Figures 2 and 3. The outer end 52 of the bar is provided with angularly disposed faces for the application of actuating means and desirably extends through the slot 53 in and beyond the forward wall of the fifth wheel to facilitate the application of the force by which the bushing is pressed against the lock bar.

In addition to its action as a forcing means the bolt and its related structure perform another very useful function. In the normal fifth wheel the only means for preventing the upward movement of the king pin is the lock bar. Consequently the usual play in the king pin socket enables the king pin to angle about the lock bar, exposing both members to excessive stresses. Such angling is entirely prevented by the presence of the forcing means as the king pin is locked against vertical as well as horizontal movement.

The enlarged socket does not render the fifth wheel particularly suitable for use with a standard king pin without a bearing. However, by using a bolt longer than would normally be necessary, the fifth wheel can be used with the standard king pin without danger of uncoupling, since the cylindrical surface or face of the head will function as the forward wall of the socket and by adjustment of the bolt the socket can be made of any desired size. This is only a temporary expedient in the event that the bushing should break in service as the head with its relatively small engaging surface will wear very rapidly when exposed to the angling movement of the king pin.

Before coupling the truck to a trailer it is desirable to retract the head 50, as shown in Figures 2 and 3, so that the king pin assembly will strike the forward wall of the socket which will absorb the shock. Otherwise the transmission of the shock to the fifth wheel through the lug might break the lug from the cover, rendering the forcing means inoperative. After the king pin is once within the socket, the bolt can be tightened without fear of breakage, since further shocks are prevented by the locking of the bushing against movement. It may also be found necessary to loosen the bolt before uncoupling the trailer to facilitate the withdrawal of the retaining means from its king pin engaging position.

It will be apparent from the above detailed description and the accompanying drawings that there has been provided a simple constructed, inexpensive and easily operable coupling for trucks and trailers by which the free angling movement of the coupled units is retained while wearing of the engaging parts of the coupling is practically eliminated and those parts most subject to wear are easily disassembled and replaced. It should be understood that the illustrated embodiment is merely an exemplification of the principles involved and the right is reserved to make all such changes as will not depart from the spirit of the invention or the scope of the appended claims.

Having now described my invention, what I claim and desire to secure by Letters Patent is:

1. In a coupling for a power unit and a trailer body, whereby a fifth wheel having a king pin socket and means for retaining a king pin in said socket is mounted on a power unit; the combination of a king pin depending from the trailer body, a bearing encircling and movably associated with said king pin, and means associated with said fifth wheel for forcing said bearing into engagement with the king pin retaining means to prevent relative movement therebetween while permitting rotation of the king pin within the king pin bearing.

2. In combination with a fifth wheel mounted on a power unit, said fifth wheel having a socket and means for retaining a king pin in said socket; a king pin depending from a trailer body, a sleeve rotatably surrounding said king pin, and means associated with said fifth wheel for preventing movement between said sleeve and said king pin retaining means.

3. In a coupling for a power unit and a trailer body, wherein a fifth wheel having a socket and means for retaining a king pin in said socket is mounted on a power unit; the combination of a king pin, a sleeve rotatably surrounding said king pin, means associated with said fifth wheel for preventing relative movement between said sleeve and said king pin retaining means when the power unit and trailer body are connected, and means carried by said king pin for reducing friction between the said fifth wheel and said trailer body.

4. In a coupling for a truck and trailer wherein a fifth wheel having a socket and means for retaining a king pin in said socket is mounted on said power unit; the combination of a king pin depending from the trailer body, a bearing disk carried by and radiating from said king pin, a sleeve rotatably surrounding said king pin, said sleeve being adapted to maintain said disk in operative position, and means associated with said fifth wheel for preventing movement between said sleeve and said king pin retaining means.

5. In a coupling for tractors and trailers wherein a fifth wheel having a pocket for the reception of a king pin member and means for retaining said king pin member within said pocket is mounted on a tractor; the combination of a king pin member depending from a trailer, a sleeve member rotatably surrounding said king pin, and means associated with said king pin and adapted to engage said fifth wheel for reducing friction between said fifth wheel and said trailer, said means being maintained in operative position by one of said members.

6. In a coupling for a power unit and a trailer body, wherein a fifth wheel having a socket for the reception of a king pin and means for retaining said king pin within said socket is mounted on a power unit; the combination of a king pin depending from the trailer body, a perforated bearing disk carried by said king pin, said perforations being adapted to receive a lubricant, a sleeve rotatably surrounding said king pin and adapted to maintain said disk in operative position, and means associated with said fifth wheel for forcing said sleeve into engagement with said king pin retaining means to prevent movement therebetween.

7. A king pin assembly for a tractor and trailer coupling, comprising a king pin depending from the trailer body, a sleeve rotatably surrounding said king pin and adapted to interlock with and immovably engage a fifth wheel on the tractor, and means associated with said king pin for holding said king pin and sleeve in assembled relation.

8. A king pin assembly comprising a king pin, a bearing disk carried by said king pin, a sleeve, and means associated with said sleeve for holding said king pin, disk and sleeve in assembled relation.

9. A king pin assembly for coupling a trailer body to a fifth wheel mounted on a power unit, comprising a king pin formed with a peripheral groove, a sleeve having a peripheral relief rotatably surrounding said king pin, said sleeve being provided with opposing slots registering with the peripheral groove on said trunnion element, and a key passing through said slots for holding said sleeve and said king pin in assembled relation.

10. In a coupling for a truck and trailer wherein a fifth wheel having a socket for the reception of a king pin is mounted on the truck; the combination of a king pin, and means associated with said king pin and adapted to engage said fifth wheel for reducing the wear of the engaging parts of said coupling, said means including a bearing disk and a sleeve encircling said king pin, said sleeve being adapted to maintain said disk in operative position.

11. In a coupling for a power unit and trailer body wherein a fifth wheel having a socket for the reception of a king pin is mounted on the power unit; the combination of a king pin, a bushing rotatably surrounding said king pin adapted to be received in said socket, and means associated with said fifth wheel for preventing movement between said fifth wheel and said bushing.

12. In a coupling for a power unit and a trailer body wherein a fifth wheel having a socket for the reception of a king pin, and means for retaining said king pin within said socket is mounted on the power unit; the combination of a king pin, a sleeve rotatably surrounding said king pin, and means for forcing the sleeve into engagement with said king pin retaining means, said forcing means comprising a bolt rotatably associated with the fifth wheel and having a head movably associated with the bolt and adapted to engage the sleeve.

ROBERT A. FONTAINE.